United States Patent
Inagaki

(10) Patent No.: US 10,255,405 B2
(45) Date of Patent: Apr. 9, 2019

(54) SUPPORTING APPARATUS OF SEMICONDUCTOR INTEGRATED CIRCUIT, COUNTERMEASURE METHOD OF ELECTROMAGNETIC INTERFERENCE OF SEMICONDUCTOR INTEGRATED CIRCUIT, AND RECORDING MEDIUM

(71) Applicant: ROHM CO., LTD., Ukyo-Ku, Kyoto (JP)

(72) Inventor: Ryosuke Inagaki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 63 days.

(21) Appl. No.: 15/272,824

(22) Filed: Sep. 22, 2016

(65) Prior Publication Data

US 2017/0091373 A1     Mar. 30, 2017

(30) Foreign Application Priority Data

Sep. 29, 2015  (JP) ................................. 2015-192034

(51) Int. Cl.
*G06F 17/50* (2006.01)

(52) U.S. Cl.
CPC ...... *G06F 17/5081* (2013.01); *G06F 17/5036* (2013.01); *G06F 17/5022* (2013.01); *G06F 17/5027* (2013.01); *G06F 2217/82* (2013.01)

(58) Field of Classification Search
CPC ............. G06F 17/5022; G06F 17/5027; G06F 17/5081; G06F 17/5036
USPC ........................................................ 716/136
See application file for complete search history.

(56) References Cited

FOREIGN PATENT DOCUMENTS

JP          2004157889 A        6/2004

*Primary Examiner* — Stacy Whitmore
(74) *Attorney, Agent, or Firm* — Cantor Colburn LLP

(57) ABSTRACT

A design supporting apparatus of a semiconductor integrated circuit includes an input device configured to receive data of a transient current waveform, a first modeling part configured to model the semiconductor integrated circuit as a current source for generating the transient current waveform and to connect the current source and an equivalent circuit of an evaluation board to generate an evaluation circuit model, a first calculation part configured to calculate electromagnetic interference of the evaluation circuit model, a first correction part configured to correct a portion of the equivalent circuit of the evaluation board, a second modeling part configured to add an additional circuit to a corrected evaluation circuit model to generate a countermeasure circuit model, a second calculation part configured to calculate electromagnetic interference of the countermeasure circuit model, and a second correction part configured to correct the additional circuit.

3 Claims, 9 Drawing Sheets

212a

212b

212c

212d

SUPPORTING APPARATUS OF SEMICONDUCTOR INTEGRATED CIRCUIT, COUNTERMEASURE METHOD OF ELECTROMAGNETIC INTERFERENCE OF SEMICONDUCTOR INTEGRATED CIRCUIT, AND RECORDING MEDIUM

CROSS-REFERENCE TO RELATED APPLICATION

This application is based upon and claims the benefit of priority from Japanese Patent Application No. 2015-192034, filed on Sep. 29, 2015, the entire contents of which are incorporated herein by reference.

TECHNICAL FIELD

The present disclosure relates to a design supporting apparatus for verifying electromagnetic interference (EMI).

BACKGROUND

Recently, tendency for semiconductor integrated circuits (ICs) to save energy has been increasing and various switching technologies have been introduced. As a result, multi-functional and high performance products are able to operate for a long period of time with battery. However, a specific circuit operation thereof affects the electromagnetic compatibility (EMC), especially EMI to become considerably aggravated.

Vendors of semiconductor ICs are required to carefully verify semiconductor ICs such that the EMC characteristics thereof satisfy standard values at a product design stage. However, it is difficult to precisely predict the EMC characteristics, especially EMI, by a circuit simulator, so that a great amount of efforts are required to verify the EMI.

SUMMARY

The present disclosure provides some embodiments of a design supporting tool useful for verifying the EMC characteristics.

According to one embodiment of the present disclosure, there is provided a design supporting apparatus of a semiconductor integrated circuit, including: an input device configured to receive data of a transient current waveform flowing through a power terminal or an output terminal of the semiconductor integrated circuit as an evaluation target, which is calculated by simulation; a first modeling part configured to model the semiconductor integrated circuit as a current source for generating the transient current waveform and to connect the current source and an equivalent circuit of an evaluation board to generate an evaluation circuit model; a first calculation part configured to calculate electromagnetic interference of the evaluation circuit model; a first correction part configured to correct a portion of the equivalent circuit of the evaluation board such that a difference between a calculated value of the electromagnetic interference of the evaluation circuit model and its measured value is smaller than a tolerance; a second modeling part configured to add an additional circuit including at least one circuit element to a corrected evaluation circuit model to generate a countermeasure circuit model; a second calculation part configured to calculate electromagnetic interference of the countermeasure circuit model; and a second correction part configured to correct the additional circuit such that a calculated value of the electromagnetic interference of the countermeasure circuit model is smaller than a standard value.

According to this embodiment, in the first correction part, by calculating the electromagnetic interference of the countermeasure circuit after correcting a portion of the equivalent circuit such that a difference between a calculated value of electromagnetic interference of the evaluation circuit model and its measured value is small, it is possible to improve the calculation precision of electromagnetic interference of the countermeasure circuit and to facilitate the electromagnetic interference countermeasure.

Also, arbitrarily combining the foregoing components or substituting the components or expressions of the present disclosure with each other among a method, an apparatus, and a system is also effective as an embodiment of the present disclosure.

DETAILED DESCRIPTION

Figure 1:
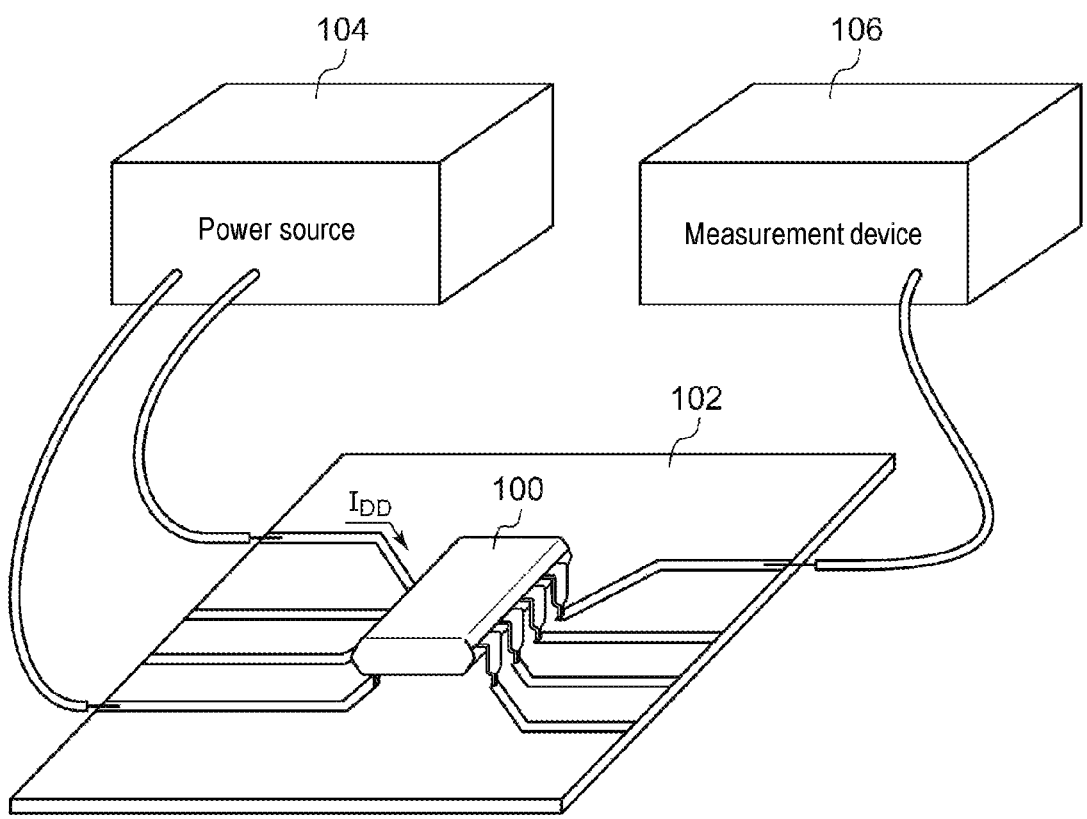
FIG. 1 is a view schematically illustrating a board for evaluating EMC characteristics.

Embodiments of the present disclosure will be now described in detail with reference to the drawings. Like or equivalent components, members, and processes illustrated in each drawing are given like reference numerals and a repeated description thereof will be properly omitted. Also, the embodiments are presented by way of example only, and are not intended to limit the present disclosure. Any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state thereof.

Similarly, "a state where a member C is installed between a member A and a member B" also includes a case where the member A and the member C or the member B and the member C are indirectly connected through any other member that does not affect an electrical connection state, in addition to a case where the member A and the member C or the member B and the member C are directly connected.

An outline of electromagnetic interference (EMI) will be described. As standards for EMI of conducted emission, (i) conducted emission of a semiconductor integrated circuit (LSI or IC) group, ii) IEC 61967-4 (150Ω/1Ω method) and CISPR22 (information technology equipment) targeting consumer products and CISPR25 (vehicles, boats, and internal combustion engines) targeting vehicle products, and the like have been developed. In these standards, standard values have been set for each band of EMI in an LSI or an IC.

FIG. 1 is a view schematically illustrating a board for evaluating electromagnetic compatibility (EMC) characteristics. A semiconductor integrated circuit (hereinafter, referred to as "IC") 100 as an evaluation target is mounted on an evaluation board 102. The specifications of EMC standard are set for respective applications of the IC 100, and an IC vendor designs the IC 100 and the evaluation board 102 according to the specifications. When EMC characteristics are evaluated, a power source 104 and a measurement device 106 such as a spectrum analyzer are connected to the evaluation board 102. The EMC characteristics are evaluated in order that is set in the standards, and it is determined whether a reference value is satisfied.

Further, when the measurement value does not satisfy the reference value, the IC 100 or the evaluation board 102 is corrected. The vendor repeats these operations until the reference value is satisfied. When the EMC does not satisfy the reference value, the IC 100 may be requested to be considerably changed in design.

Such evaluation and countermeasure of EMC characteristics require many efforts. Hereinafter, a countermeasure method of EMC characteristics and a design supporting tool useful for verification will be described.

Figure 2:
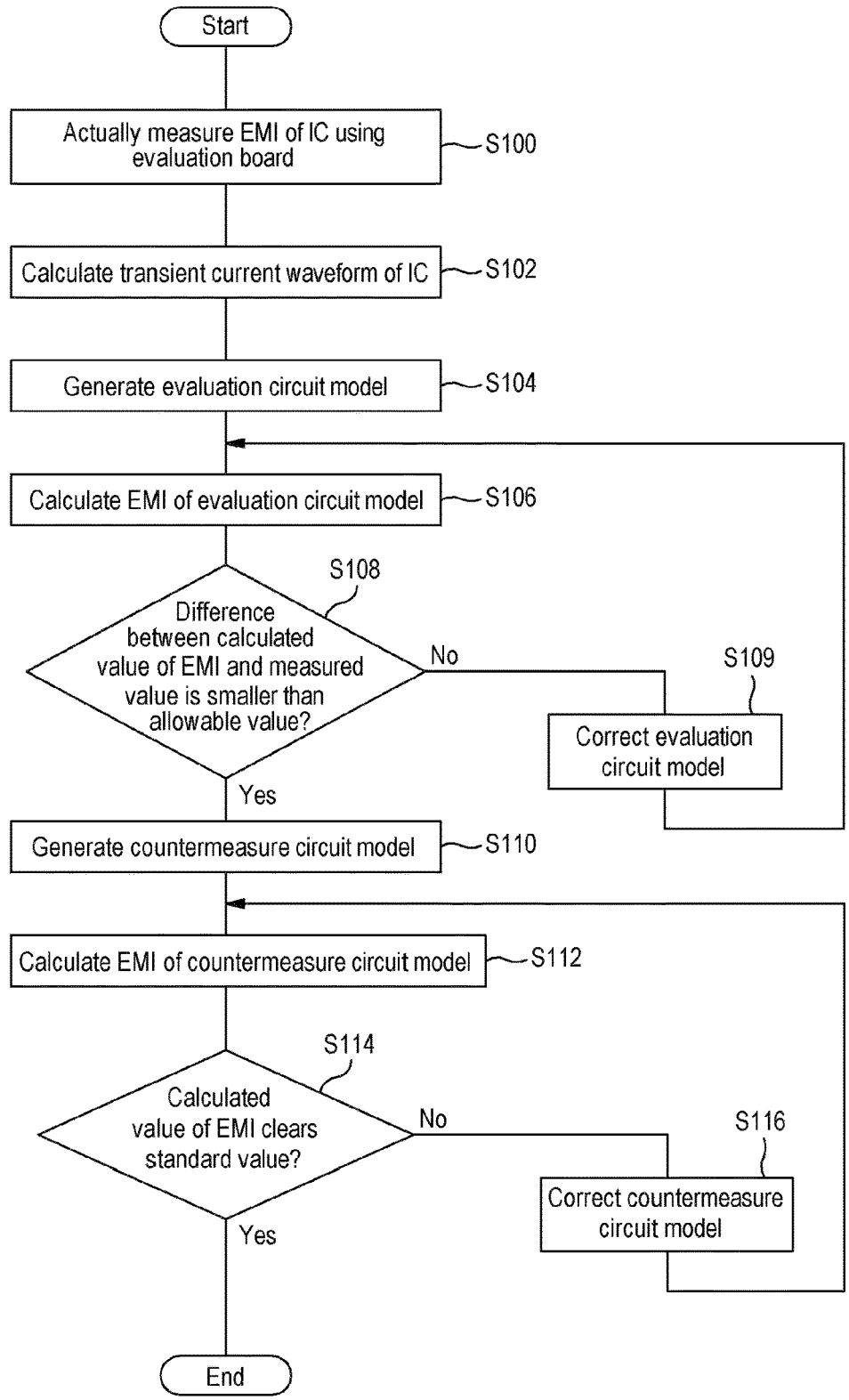
FIG. 2 is a flowchart of an electromagnetic interference countermeasure according to an embodiment.

FIG. 2 is a flowchart illustrating EMI countermeasure according to an embodiment. EMI of the IC 100 is actually measured using the evaluation board 102 of FIG. 1 at S100.

Thereafter, a transient current waveform $I_{DD}$ flowing through a power terminal of the evaluation target IC 100 and a transient current waveform $I_{DDT}$ flowing through an output terminal are computed at S102. In the following descriptions, the current $I_{DD}$ flowing through the power terminal is considered. For example, a net list of the IC 100 is generated by a circuit design tool and input to a circuit simulator. Then, the transient current waveform $I_{DD}$ flowing through the power terminal is calculated using a transient analysis function of the circuit simulator. In order to calculate the transient current waveform $I_{DD}$, for example, Spectre (registered trademark) circuit simulator of Cadence Inc. or the like may be used, but the present disclosure is not particularly limited thereto. The transient current waveform $I_{DD}$ is preserved as waveform calculation data in a predetermined file form.

Figure 3:
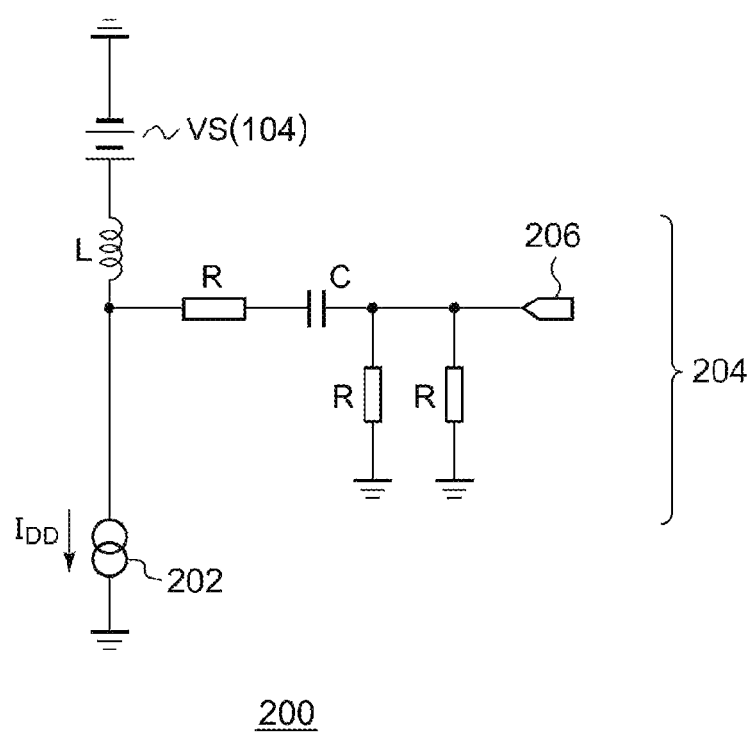
FIG. 3 is a circuit diagram illustrating an evaluation circuit model.

Thereafter, an evaluation circuit model 200 is generated in the circuit simulator at S104. FIG. 3 is a circuit diagram illustrating the evaluation circuit model 200. In the evaluation circuit model 200, the IC 100 is modeled as a current source 202. And then, the waveform calculation data of the transient current waveform $I_{DD}$ is read as an output current of the current source 202. Thereafter, the current source 202 and an EMC characteristic evaluation circuit 204 on the evaluation board 102 of FIG. 1 are connected to each other, and the evaluation circuit model 200 is generated. The contents of the EMC characteristic evaluation circuit 204 differ in every standard. For example, the evaluation circuit 204 of FIG. 3 conforms to the IEC 61967-4 standard defining a conducted emission, and may include a voltage source VS, an inductor L, some resistors R, and a capacitor C. A voltage of a measurement point 206 is measured and EMC characteristics are evaluated based on of a spectrum thereof.

Referring back to FIG. 2, the circuit simulator calculates EMI with respect to the evaluation circuit model 200 at S106. Thereafter, the calculated value of EMI of the evaluation circuit model is compared with a measurement value of EMI to evaluate a degree of error at S108. When a difference between the calculated value and the measurement value is smaller than a tolerance ("Y" in S108), the evaluation circuit model 200 is estimated to have a sufficient precision, and the process proceeds to the countermeasure process. When the difference between the calculated value and the measured value is greater than the tolerance ("N" in S108), the evaluation circuit model 200 is corrected at S109. Specifically, a portion of the evaluation circuit 204 of the evaluation board 102 is corrected in step S109. The correction is performed by (1) changing a circuit constant of an IC peripheral circuit element and (2) adding a parasitic element (equivalent series resistance (ESR) or equivalent series inductance (ESL)) of wiring of the evaluation board 102 to adjust a circuit constant thereof. After the correction, EMI is again calculated with respect to the evaluation circuit model 200. The correction is repeated until the difference between the calculated value and the measured value of EMI falls within the tolerance at S108.

By steps S100 to S109 described above, the calculation precision of the entire evaluation system including the IC 100 and the evaluation board 102 is sufficiently high, and thus, it can be said that the prediction possibility is sufficiently increased by the EMI simulation. Thereafter, an EMC countermeasure is devised in the circuit simulator so as to satisfy a standard value of EMC.

Figure 4:
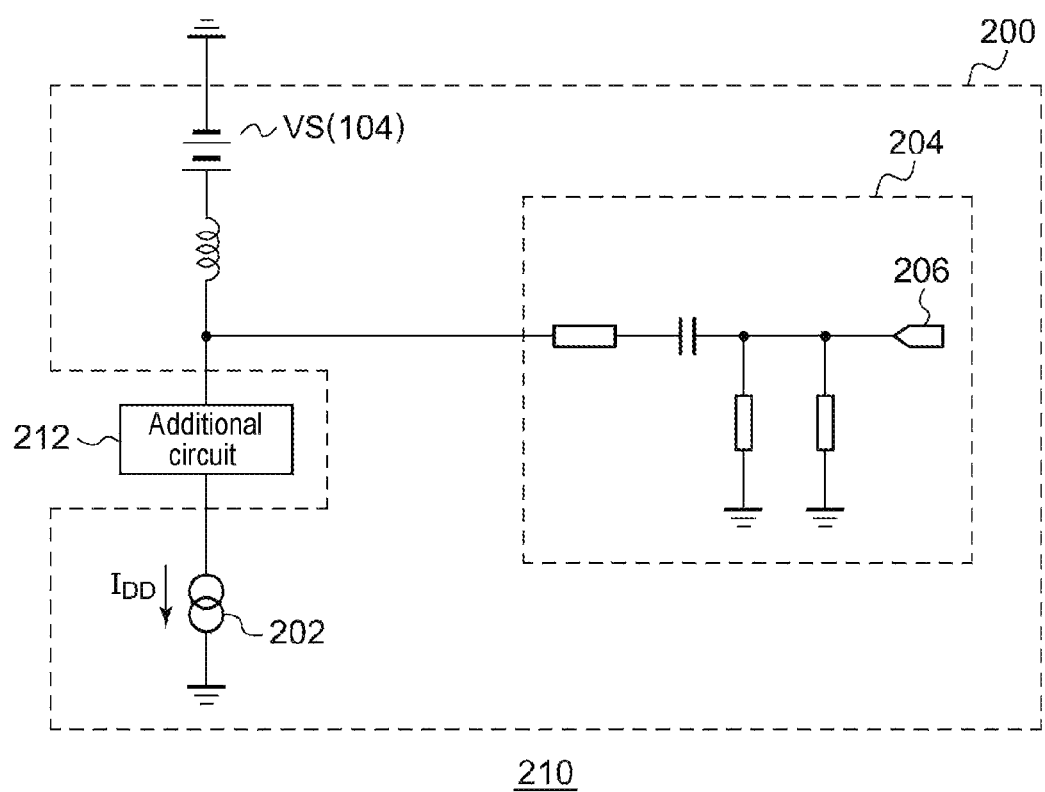
FIG. 4 is a circuit diagram illustrating a countermeasure circuit model.
Figure 5A:
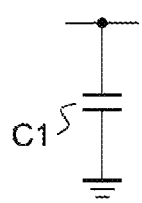
FIGS. 5A to 5D are circuit diagrams illustrating configuration examples of an additional circuit.
Figure 5B:
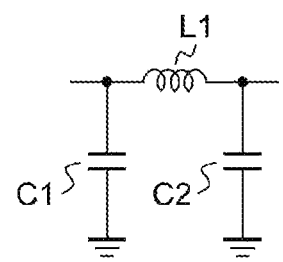
Figure 5C:
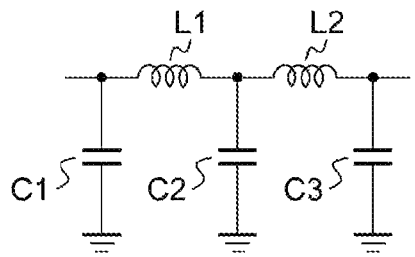
Figure 5D:
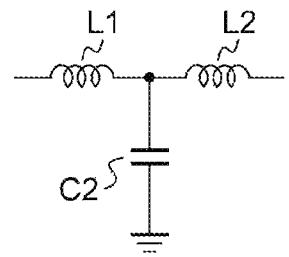

In the circuit simulator, a countermeasure circuit model 210 is prepared at S110. FIG. 4 is a circuit diagram illustrating the countermeasure circuit model 210. The countermeasure circuit model 210 is obtained by adding an additional circuit 212 including at least one circuit element to the corrected evaluation circuit model 200. A configuration and an addition position of the additional circuit 212 are not particularly limited and an effective circuit may be configured to reduce EMI. For example, it is effective to add the additional circuit 212 between an output terminal (i.e., the power terminal of the IC 100) of the current source 202 and the measured point 206 of the evaluation board 102. FIGS. 5A to 5D are circuit diagrams illustrating configuration examples of the additional circuit 212. An additional circuit 212a of FIG. 5A includes a bypass condenser (smoothing capacitor) C1. An additional circuit 212b of FIG. 5B is a π-type filter and includes two condensers C1 and C2, and an inductance element L1. The inductance element L1 may be a ferrite bead or a choke coil, or may be a resistance element. An additional circuit 212c of FIG. 5C is a 2-stage π-type filter and has a configuration in which a condenser C3 and an inductance element L2 are added to the additional circuit 212b of FIG. 5B. As illustrated in FIG. 5D, the additional circuit 212d may be a T-type filter 212d including the inductance elements L1 and L2, and the capacitor C2.

For modeling of chip components C and L used in the EMC countermeasure when the countermeasure circuit model 210 is generated, an SPICE (Simulation Program with Integrated Circuit Emphasis) model (circuit constant, parasitic element, etc.) or an S (Scattering) parameter provided by a vendor of the chip components may be used.

Referring back to FIG. 2, EMI is subsequently calculated with respect to the countermeasure circuit model 210 at S112. And then, it is determined whether the calculated EMI clears a standard value defined in the standards at S114. When the calculated EMI clears the standard value ("Y" in S114), the EMC countermeasure is terminated.

When the calculated EMI does not clear ("N" in S114), the circuit constant of the countermeasure circuit model 2100 is finely adjusted or a circuit form thereof is changed, and the countermeasure circuit model 210 is corrected at S116. Thereafter, EMI is calculated with respect to the corrected countermeasure circuit model 210 at S112. It is again determined whether a calculated value of EMI clears the standard value defined in the standards at S114. This correction is repeated until the calculated value finally clears a standard value.

Figure 6A:
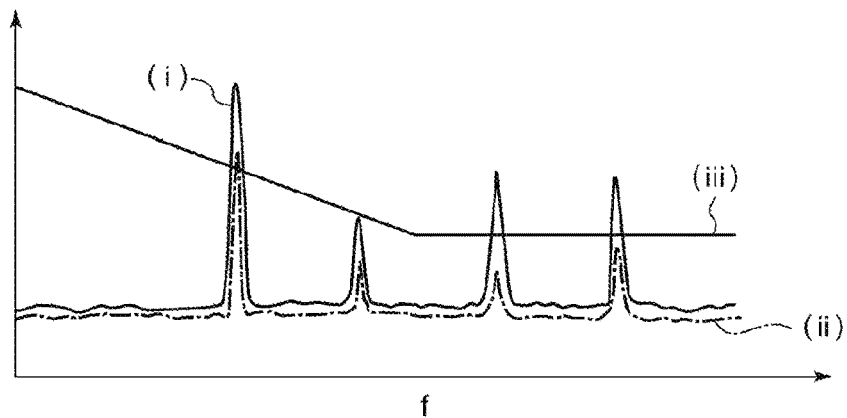
FIGS. 6A to 6C are diagrams illustrating the spectrums of electromagnetic interference.
Figure 6B:
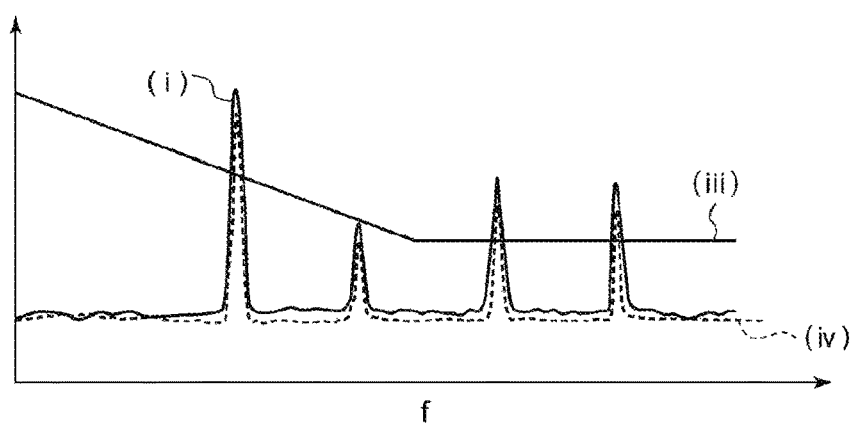
Figure 6C:
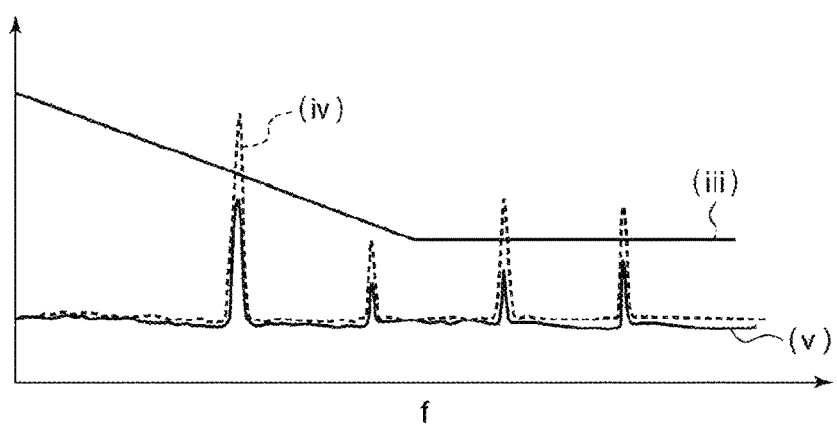

The flowchart of the EMC countermeasure method according to an embodiment has been described above. FIGS. 6A to 6C are views illustrating the spectrums of EMI. FIG. 6A shows (i) a measurement value of EMI in a combination of the IC 100 and the evaluation board 102, (ii) a calculated value of EMI of the evaluation circuit model 200, and (iii) a standard value of EMI. The spectrum (i) is obtained in step S100 of FIG. 2 and the spectrum (ii) is obtained in step S106.

Thereafter, as illustrated in FIG. 6B, a waveform (iv) of EMI of the evaluation circuit model 200 sufficiently approximates the measured value (i) of EMI of the IC 100 in steps S108 and S109. And then, as illustrated in FIG. 6C, a calculated value (v) of EMI of the countermeasure circuit model 210 is calculated in step S112, and the additional circuit 212 is corrected such that the calculated value (v) clears the standard value (iii) in steps S114 and S116.

According to this countermeasure method, the calculated value and the measured value of EMI are matched with respect to the evaluation circuit model 200 prior to the addition of the additional circuit 212, and after a calculation precision, namely, a prediction possibility, is sufficiently increased, the additional circuit 212 is added to verify the circuit after countermeasure. That is to say, since an estimated calculation value in the countermeasure circuit is calculated as a difference of only the added component by optimizing a constant of a parasitic element or the like such that a calculated value matches a measured value once, it is possible to obtain a high calculation system.

Further, in a case where a component used when the measured value and the calculated value are matched is used again in the countermeasure circuit, since the component has been already matched the measured value, an error of the estimated calculation value becomes very small. Specifically, when the measured value and the calculated value are matched in a circuit using one condenser (not suitable for the EMC standards at this time), it is effective when a circuit is configured by increasing the number of condenser to two or three ones as a countermeasure circuit to perform calculation and prediction.

There are few components of the additional circuit 212, and a high precision circuit model (parameter) of chip components constituting the additional circuit 212 is provided from a component vendor. Thus, the simulation precision regarding the part of the additional circuit 212 is considered to be sufficiently high. In this sense, also with respect to the entire countermeasure circuit model 210 including the evaluation circuit module 200 and the additional circuit 212, the EMI thereof may be calculated with high precision and predicted.

Figure 7:
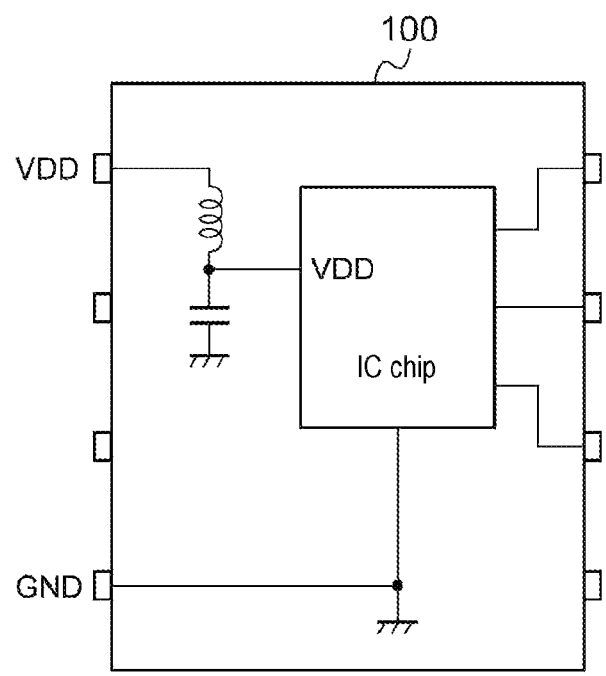
FIG. 7 is a circuit diagram illustrating an example of an IC after changing a design.

Thereafter, the designer of the IC 100 reflects the additional circuit 212 to the IC 100 when the standard value is finally cleared. FIG. 7 is a circuit diagram illustrating an example of the IC 100 after changing the design. The additional circuit 212b of FIG. 5B is reflected to the IC 100. Further, since the capacitor C1 of FIG. 5B may be externally provided at the power terminal VDD of the IC 100, it may not necessarily be embedded in the IC 100. Alternatively, all of the additional circuit 212 may be externally provided at the IC 100. In this case, the vendor of the IC 100 may describe the configuration of the additional circuit 212 to be externally provided in a specification sheet and instruct a user to design a print circuit board based on the specification sheet.

Figure 8:
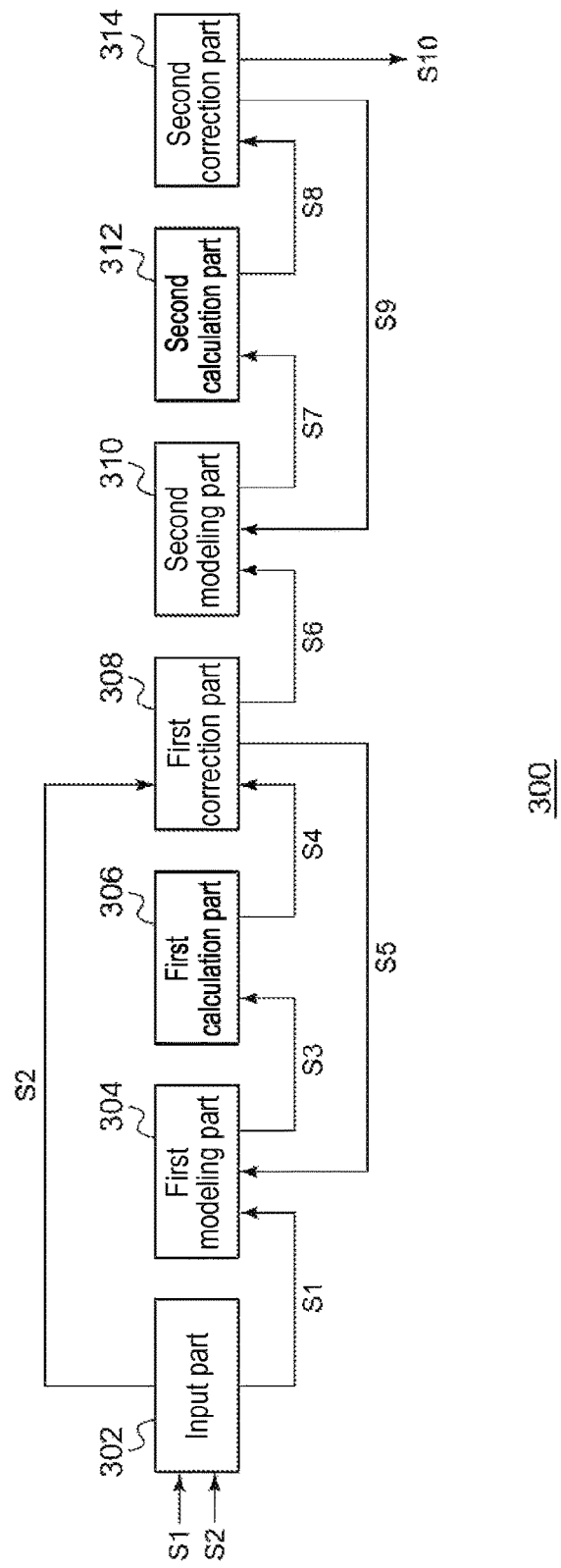
FIG. 8 is a block diagram of a design supporting apparatus according to an embodiment.

FIG. 8 is a block diagram of a design supporting apparatus according to an embodiment. Design supporting equipment 300 includes an input device 302, a first modeling part 304, a first calculation part 306, a first correction part 308, a second modeling part 310, a second calculation part 312, and a second correction part 314.

The input device 302 receives data S1 of a transient current waveform $I_{DD}$ flowing through the power terminal VDD of the IC 100 as an evaluation target, which is calculated advance by the transient analysis of a circuit simulator. The input device 302 also receives data S2 of a measured value of EMI of the IC 100.

The waveform calculated data S1 is read by the first modeling part 304, an evaluation circuit model 200 is generated, and first circuit data S3 describing the evaluation circuit model 200 is generated. The actually measured data S2 of EMI is read by the first correction part 308. The first calculation part 306 calculates EMI of the evaluation circuit model 200 based on the first circuit data S3 to generate first EMI data S4.

The first correction part 308 corrects a portion of the evaluation circuit 204 of the evaluation board such that the calculated value of EMI (first EMI data) of the evaluation circuit model 200 falls within an error range determined based on the measured value S2, and provides first correction data S5 regarding the correction to the first modeling part 304. The first modeling part 304 reflects the first correction data S5 to the first circuit data S3, and the first calculation part 306 re-calculates EMI with respect to the first circuit data S3. An algorithm of adjusting a certain parameter such that a certain amount approximates its target value may use a known technique and is not particularly limited thereto.

When the correction is completed by the first correction part 308, circuit data S6 of a final evaluation circuit model 200 is input to the second modeling part 310. The second modeling part 310 adds an equivalent circuit equivalent to the additional circuit 212 to the circuit data S6 of the evaluation circuit model 200 to generate a countermeasure circuit model 210 and generate second circuit data S7 describing the countermeasure circuit model 210. The second calculation part 312 calculates EMI of the countermeasure circuit model 210 based on the second circuit data S7 to generate second EMI data S8.

The second correction part 314 corrects the additional circuit 212 such that the calculated value of EMI (second EMI data) of the countermeasure circuit model 210 clears the standard value based on the standards, and provides second correction data S9 regarding the correction to the second modeling part 310. The second modeling part 310 reflects the second correction data S9 to the second circuit data S7, and the second calculation part 312 re-calculates EMI with respect to the second circuit data S7. When the calculated value of EMI clears the standard value, the correction by the second correction part 314 is completed. Circuit data S10 of a final countermeasure circuit model 210 at that time is written into a file and preserved or displayed on a display device.

Figure 9:
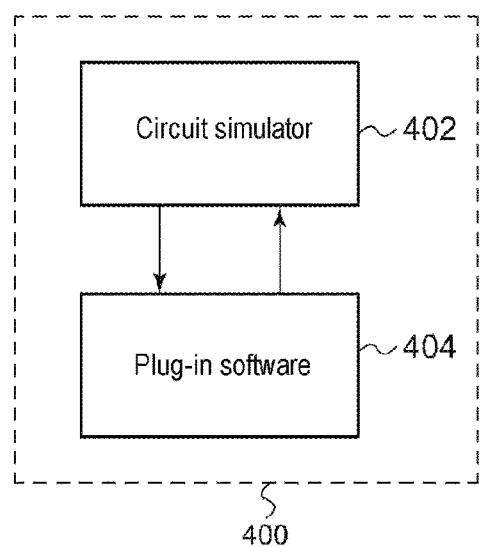
FIG. 9 is a block diagram of an EMC verification program.

The design supporting equipment 300 of FIG. 8 is configured with a combination of hardware resource such as a computer, and an EMC verification program. FIG. 9 is a block diagram of an EMC verification program 400. A portion of the verification program 400 may be configured by using the function of a circuit simulator 402 on the market as it is, and the functions that are not provided by the circuit simulator 402 on the market are newly created as an add-in program (plug-in software) 404 of the circuit simulator 402, or as a separate software.

The present disclosure has been described above with reference to the embodiment. It is to be understood by those skilled in the art that the embodiment is merely illustrative and may be variously modified by any combination of the components or processes, and the modifications are also within the scope of the present disclosure. Hereinafter, these modifications will be described.

In the embodiment, a transient current waveform of a power source current or an output current is calculated by simulation, but instead, actually measured data may also be used.

According to the present disclosure in some embodiments, it is possible to facilitate the EMI countermeasure.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A design supporting apparatus of a semiconductor integrated circuit used as an evaluation target, comprising:
   an input device configured to receive:
      from a circuit simulator, data of a transient current waveform flowing through a power terminal or an output terminal of the semiconductor integrated circuit used as the evaluation target; and
      from a measurement device, a measured value of electromagnetic interference of the semiconductor integrated circuit; and
   a processor configured to:
      model the semiconductor integrated circuit as a current source for generating the transient current waveform and connect the current source and an equivalent circuit of an evaluation board to generate an evaluation circuit model;
      calculate electromagnetic interference of the evaluation circuit model;
      correct a portion of the equivalent circuit of the evaluation board such that a difference between a calculated value of the electromagnetic interference of the evaluation circuit model and the measured value of the electromagnetic interference of the semiconductor integrated circuit is smaller than a tolerance;
      add an additional circuit including at least one circuit element to a corrected evaluation circuit model to generate a countermeasure circuit model;
      calculate electromagnetic interference of the countermeasure circuit model;
      correct the additional circuit such that a calculated value of the electromagnetic interference of the countermeasure circuit model is smaller than a standard value; and
      write, after the additional circuit is corrected, a circuit data of the countermeasure circuit model into a file for display on a display device such that a semiconductor integrated circuit product is manufactured based on the written circuit data.

2. A countermeasure method of electromagnetic interference of a semiconductor integrated circuit used as an evaluation target, comprising:
   receiving, from a circuit simulator, a transient current waveform flowing through a power terminal or an output terminal of the semiconductor integrated circuit used as the evaluation target;
   receiving, from a measurement device, a measured value of electromagnetic interference of the semiconductor integrated circuit;
   performing, by a processor, a process including:
      modeling the semiconductor integrated circuit as a current source for generating the transient current waveform and connecting the current source and an equivalent circuit of an evaluation board to generate an evaluation circuit model;
      calculating electromagnetic interference of the evaluation circuit model;
      correcting a portion of the equivalent circuit of the evaluation board such that a difference between a calculated value of the electromagnetic interference of the evaluation circuit model and the measured value of the electromagnetic interference of the semiconductor integrated circuit is smaller than a tolerance;
      adding an additional circuit including at least one circuit element to a corrected evaluation circuit model to generate a countermeasure circuit model;
      calculating electromagnetic interference of the countermeasure circuit model;
      correcting the additional circuit such that a difference between a calculated value of the electromagnetic interference of the countermeasure circuit model and the measured value of the electromagnetic interference of the semiconductor integrated circuit is smaller than the tolerance; and
      writing, after the additional circuit is corrected, a circuit data of the countermeasure circuit model into a file for display on a display device such that a semiconductor integrated circuit product is manufactured based on the written circuit data.

3. A non-transitory computer-readable recording medium storing a computer program for causing a computer to perform a process, the process comprising:
   receiving, from a circuit simulator, data of a transient current waveform flowing through a power terminal or an output terminal of a semiconductor integrated circuit as an evaluation target;
   receiving, from a measurement device, a measured value of electromagnetic interference of the semiconductor integrated circuit;
   modeling, by a processor in the computer, the semiconductor integrated circuit as a current source for generating the transient current waveform and connecting the current source and an equivalent circuit of an evaluation board to generate an evaluation circuit model;
   calculating, by the processor, electromagnetic interference of the evaluation circuit model;
   correcting, by the processor, a portion of the equivalent circuit of the evaluation board such that a difference between a calculated value of the electromagnetic interference of the evaluation circuit model and the measured value of the electromagnetic interference of the semiconductor integrated circuit is smaller than a tolerance;

adding, by the processor, an additional circuit including at least one circuit element to a corrected evaluation circuit model to generate a countermeasure circuit model;

calculating, by the processor, electromagnetic interference of the countermeasure circuit model;

correcting, by the processor, the additional circuit such that a calculated value of the electromagnetic interference of the countermeasure circuit model is smaller than a standard value; and writing, by the processor, after the additional circuit is corrected, a circuit data of the countermeasure circuit model into a file for display on a display device such that a semiconductor integrated circuit product is manufactured based on the written circuit data.

\* \* \* \* \*